United States Patent [19]
Naldi

[11] Patent Number: 6,029,555
[45] Date of Patent: Feb. 29, 2000

[54] MACHINE FOR CUTTING FLAT BODIES

[75] Inventor: Valter Naldi, Bologna, Italy

[73] Assignee: Selco SPA, Pesaro, Italy

[21] Appl. No.: 09/177,258

[22] Filed: Oct. 22, 1998

[30]  Foreign Application Priority Data

Oct. 22, 1997 [IT] Italy .................................. BO97A0632

[51] Int. Cl.[7] .................................................. B26D 7/02
[52] U.S. Cl. .............................. 83/451; 83/473; 83/474; 83/477.2; 83/953; 269/56; 144/287
[58] Field of Search ........................... 83/953, 614, 473, 83/474, 451, 158, 477.2; 269/56, 57; 144/287

[56]  References Cited

U.S. PATENT DOCUMENTS 4,161,974  7/1979  Patterson ................................. 144/287
5,253,400  10/1993  Conachen ..................................... 29/55

FOREIGN PATENT DOCUMENTS 2330475  1/1974  Germany .
2330476  1/1974  Germany .
3004966  10/1980  Germany .

Primary Examiner—Lee Young
Assistant Examiner—Rick Kiltae Chang
Attorney, Agent, or Firm—Frost & Jacobs LLP

[57]  ABSTRACT

A machine for cutting flat bodies, wherein a fixed first table supports flat bodies to be cut into strips; a straight cutting line, located between an input station and an output station, being travelled by a rotary tool for cutting the flat bodies in a given cutting pattern; and a movable second table being connectable to the first table by connecting means, so as to be rotatable selectively about at least one vertical axis, and so as to slide parallel to the cutting line.

10 Claims, 3 Drawing Sheets

MACHINE FOR CUTTING FLAT BODIES

BACKGROUND OF THE INVENTION

The present invention relates to a machine for cutting flat bodies made of wood, acrylic material, aluminium, light alloy or similar.

The present invention may be used to advantage on lines for producing wood panels, to which the following description refers purely by way of example.

In the furniture industry, panels for shelving or for the sides and inside shelves of cupboards or wardrobes are formed by cutting flat bodies made of wood, normally of constant thickness, and of considerable size requiring a cutting machine with a very large supporting surface. As such bodies are normally rectangular, rectangular panels are particularly easy to cut by cutting the bodies along the perpendicular sides.

For this purpose, cutting machines normally comprise a base; an input station with a first fixed supporting surface for the flat bodies; and an output station downstream from the input station. The output station is separated from the input station by a cutting line along which runs a powered carriage supporting a rotary tool, which is fed along the cutting line to cut the flat bodies into strips of the required size. The machine also comprises feed members for feeding the flat bodies from the input station to the cutting line and to the output station. At the output station, the machine comprises a substantially rectangular supporting surface large enough to receive the flat bodies cut completely into strips, and which is connected laterally to the base by a fixed hinge so as to rotate between a first and second work position in the first work position, the supporting surface is parallel to the cutting line and forms an extension of the work surface on the base; in the second work position, the supporting surface is perpendicular to the cutting line and forms a lateral extension of the lateral portion of the work surface on the base to which the supporting surface is hinged. Once the flat bodies are cut into strips in the direction defined by the cutting line, the strips may therefore be cut easily in a direction perpendicular to the cutting line by first rotating the supporting surface from the first to the second position and transferring the strips onto the fixed supporting surface, and then operating strip feed members and moving the carriage with the rotary tool back and forth to cut the strips into rectangular panels, the size of which depends on the set step of the feed members.

A first drawback of the supporting surface-base connection is that of only allowing the supporting surface to assume two given positions with respect to the base, so that the operator station adapts poorly to different output requirements, as when cutting small-size panels for example. Moreover, extending substantially the same length as the cutting line, the supporting surf ace is of considerable size and weight, so that cutting machines of the above type are only feasible for grid cutting large-size flat bodies, and are totally unsuitable for cutting small strips or flat bodies in the form of small boards. For cutting small strips, in fact, such machines are preferably avoided for handling reasons. Moreover, the fixed-hinge connection between the supporting surface and the base limits the freedom of movement of the user and selection of the best work position in which to control operation of the machine. Finally, regardless of the work position assumed, the supporting surface defines the same reference by which to position the flat bodies, which seriously limits the versatility of the machine.

SUMMARY OF THE INVENTION

It is an object of the present invention to provide a machine for cutting flat bodies, designed to eliminate the aforementioned drawbacks.

According to the present invention, there is provided a machine for cutting flat bodies, said machine comprising a base; an input station having a fixed first table for supporting flat bodies; an output station located downstream from said input station and separated from the input station by a cutting station in which is defined a straight cutting line, said line being travelled by a rotary tool for cutting the flat bodies in a given cutting pattern; feed means for feeding said flat bodies to said cutting station in a direction perpendicular to said line; and at least one movable second table for receiving said flat bodies from said cutting station via said feed means; connecting means for connecting said second table to said base being provided to enable said second table to rotate about at least one vertical axis; characterized in that said connecting means comprise a guide fitted to said base; and at least one pivot member fitted to said second table and cooperating with said guide to enable said second table to rotate about said pivot member and to move parallel to a respective long side or parallel to a respective short side, so that said second table may be positioned with a long side parallel to said line or with a short side parallel to said line.

BRIEF DESCRIPTION OF THE DRAWINGS

A number of preferred non-limiting embodiments of the present invention will be described by way of example with reference to the accompanying drawings, in which.

DETAILED DESCRIPTION OF THE INVENTION

Figures 1, 2:
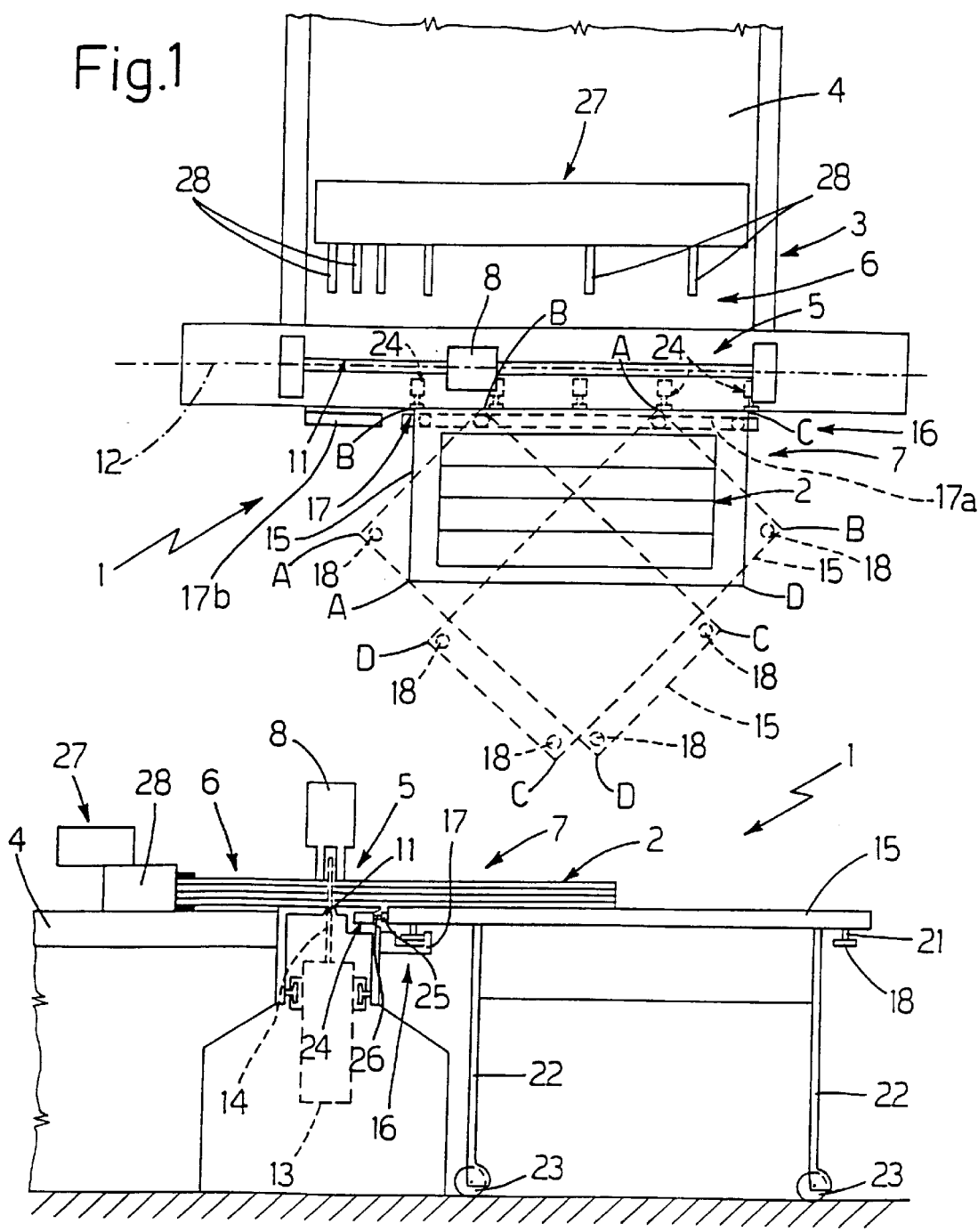
FIG. 1 shows a schematic top plan view of a first preferred embodiment of a machine in accordance with the teachings of the present invention.
FIG. 2 shows a larger-scale side view, with parts removed for clarity, of FIG. 1.

Number 1 in FIGS. 1 and 2 indicates as a whole a machine for cutting flat bodies, in particular rectangular panels 2, which may even be fed to machine 1 stacked into blocks, and which may be made of wood or other materials such as aluminium, light alloy or concrete. Machine 1 comprises a base 3 supporting a rectangular work table 4; a cutting station 5 for cutting panels 2; an input station 6 for feeding in panels 2 and defined on table 4, upstream from cutting station 5; and an output station 7 for panels 2 from cutting station 5. Base 3 supports a clamping device 8 installed at cutting station 5 and comprising a pressure member for pressing panels 2 onto table 4 during cutting; cutting station 5 comprises a slot 11 formed in base 3 and defining a straight cutting line 12; base 3, at cutting station 5, supports a carriage 13 (shown by the dash line in FIG. 2) located beneath slot 11 and travelling in a direction parallel to cutting line 12; and carriage 13 carries a cutting assembly comprising a rotary tool 14 having a blade lying in the same vertical plane as line 12.

With reference to FIGS. 1 and 2, machine 1 also comprises a four-sided work table 15, which is connected to base 3 by a connecting device 16 having a guide 17 parallel to line 12 and connected rigidly to base 3. Connecting device 16 also comprises a number of rollers 18 fitted to respective corners of table 15. More specifically, table 15 is rectangular, and has four corners A, B, C, D defined by the intersections of adjacent perpendicular sides; guide 17, in this embodiment, is defined by a straight, substantially U-shaped bar open at the top and each end; and rollers 18 are fitted to respective vertical hinge pins 21 extending downwards from the underside of table 15 at corners A, B, C and D.

With reference to FIGS. 1 and 2, guide 17 is so formed as to enable rollers 18 to be freely inserted or withdrawn; hinge pins 21 of rollers 18 are so located with respect to corners A, B, C, D that even only one roller 18 may be left inside guide 17 without the respective corner of table 15 colliding with base 3; and table 15 is provided with legs 22, each fitted with a castor 23. One or two rollers 18 of table 15 may therefore engage guide 17, so that: when two rollers 18 engage guide 17, table 15 may be moved parallel to the longitudinal axis of guide 17, which, as stated, is parallel to cutting line 12; and, when one roller 18 engages guide 17, table 15, besides moving along guide 17, may also be rotated about the axis of pin 21 supporting said roller 18. In other words, table 15 may assume widely differing configurations with respect to cutting line 12, in particular, a configuration in which a short side is parallel to cutting line 12, o r a configuration in which a long side is parallel to cutting line 12; within which configurations, the most suitable position with respect to either lateral edge of table 4 may be selected by moving table 15 parallel to cutting line 12. To switch from one to the other of the above configurations, table 15, with two rollers 18 engaging guide 17, is simply moved along guide 17 to extract one roller 18, is rotated about the axis of pin 21 supporting the roller 18 still engaging guide 17, and is simultaneously moved along guide 17 to insert a third roller 18 inside the guide.

With reference to FIGS. 1 and 2, machine 1 also comprises a device 24 which, when activated, provides for locking table 15 to base 3 in any table 15 position in which two rollers 18 engage guide 17. Device 24 comprises a number of pads 25 fitted to respective rods 26, which are movable, e.g. pneumatically, between a first position in which pads 25 are a given distance from the side of table 15 engaging guide 17, and a second position in which pads 25 contact and frictionally prevent any movement of said side of table 15.

With reference to FIGS. 1 and 2, machine 1 comprises, over table 4, a feed device 27 for activating panels 2 on table 4 and feeding panels 2, cut or not, from input station 6 to output station 7 and vice versa via cutting station 5. Device 27 comprises a number of known push grips 28 for gripping whole or cut panels 2.

Figure 3:
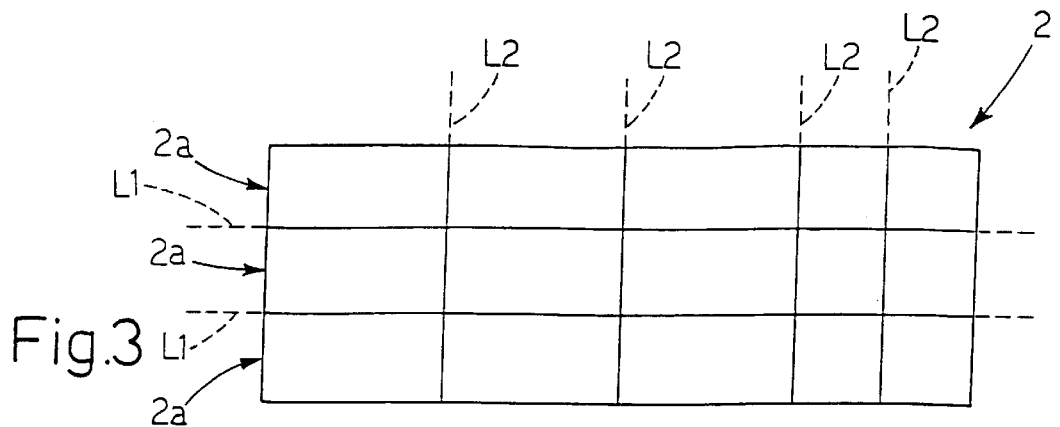
FIGS. 3 and 4 show plan views of bodies cut in different patterns.
Figure 4:
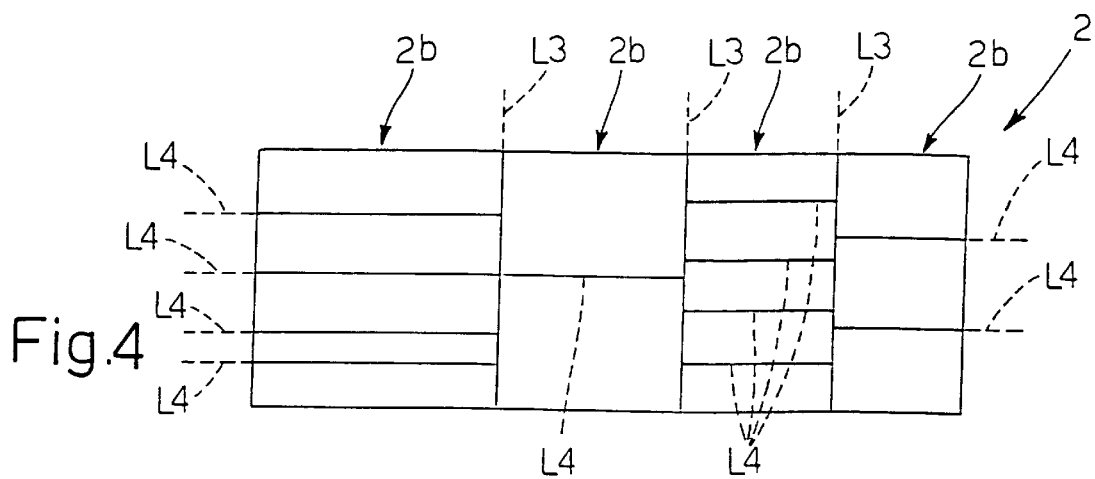

Machine 1 as described above is extremely versatile by enabling different cutting patterns, such as those shown by way of example in FIGS. 3 and 4. It should be pointed out that panels 2 are fed to cutting station 5 in conventional manner, with the long sides of panels 2 parallel to cutting line 12, so that, when feeding the panels to the cutting station, table 15 is positioned with a long side, e.g. side B-C, parallel to cutting line 12, and is locked to base by device 24.

FIG. 3 shows a cutting pattern of panels comprising a number of cuts LI parallel to the long sides of panels 2, and a number of cuts L2 parallel to the short sides of panels 2; which cuts L1 and L2 are made respectively through the whole length and width of panels 2. The FIG. 3 cutting pattern is the simplest and fastest, in that each cut is made with whole panels 2 at cutting station 5.

The method by which to perform the FIG. 3 cutting pattern comprises the steps of:

positioning table 15 with a long side, e.g. side B-C, parallel to line 12;

moving side B-C along guide 17 into such a position that the panels 2 from station 5 rest entirely on table 15;

feeding panels 2, with the long sides parallel to line 12, to cutting station 5 to make a number of cuts L1 parallel to said long sides and through the whole length of panels 2, so that the panels 2 leaving station 5 are defined, on table 15, by a number of strips 2a;

disabling device 24 to release table 15 from the base;

moving table 15 along guide 17 to extract the corner C roller 18 from the guide;

rotating table 15 about pin 21 supporting the corner B roller 18 to align the corner A roller 18 with guide 17;

moving table 15 along guide 17 to insert the corner A roller 18 inside the guide, and moving side A-B of table 15 along the guide into a position enabling all of strips 2a to be engaged by push grips 28;

enabling device 24 to lock table 15 to base 3;

transferring panels 2, by means of device 27, onto table 4 on the opposite side of cutting line 12; and feeding panels 2 to cutting station 5 to perform a number of cuts L2 through the whole width of panels 2, so that the panels 2 on table 15 are defined by a number of boards as shown in FIG. 3.

FIG. 4 shows a cutting pattern comprising a number of cuts L3 parallel to the short sides of and through the whole width of panels 2 to form a number of strips 2b; and a number of cuts L4 parallel to the long sides of panels 2 and through the whole width of strips 2b.

The method by which to perform the FIG. 4 cutting pattern comprises the steps of:

positioning table 15 with a long side, e.g. side B-C, parallel to line 12;

moving side B-C along guide 17 into such a position that the panels 2 from station 5 rest entirely on table 15;

feeding panels 2, with the long sides parallel to line 12, through cutting station 5 and onto table 15 without cutting the panels;

disabling device 24 to release table 15 from the base;

moving table 15 along guide 17 to extract the corner C roller 18 from the guide;

rotating table 15 about pin 21 supporting the corner B roller 18 to align the corner A roller 18 with guide 17;

moving table 15 along guide 17 to insert the corner A roller 18 inside the guide, and moving side A-B of table 15 along the guide into a position enabling panels 2 to be engaged by push grips 28;

enabling device 24 to lock table 15 to base 3;

transferring panels 2, by means of device 27, onto table 4 on the opposite side of cutting line 12;

feeding panels 2 to cutting station 5 to perform a number of cuts L3 through the whole width of panels 2, so that the panels 2 on table 15 are defined by a number of strips 2b;

disabling device 24 to release table 15 from base 3;

moving table 15 along guide 17 to extract the corner A roller 18 from the guide;

rotating table 15 about pin 21 supporting the corner B roller 18 to align the corner C roller 18 with guide 17;

moving side B-C of table 15 along guide 17 to first insert the corner C roller 18 inside the guide and then position table 15 as required;

enabling device 24 to lock table 15 to base 3;

transferring one strip 2b, by means of device 27, onto table 4 on the opposite side of cutting line 12;

feeding said strip 2b to cutting station 5 to make a number of cuts L4 through the whole width of strip 2b, so that the strip 2b on table 15 is defined by a number of boards;

unloading the cut strip 2b off table 15; and repeating the above operations strip by strip, i.e. transferring strip 2b onto table 4; feeding strip 2b to cutting station 5 to make cuts L4 through the whole width of the strip; and unloading the strip off table 15.

Obviously, if the same cuts L4 are to be made in two adjacent strips 2b, both strips 2b may conveniently be transferred simultaneously onto table 4 to make cuts L4 in both strips 2b in one cutting operation.

Machine 1 obviously provides for further cutting patterns comprising, for example, forming strips of the same length as panels 2, and then cutting the whole width of each strip one at a time.

In FIG. 1, guide 17 comprises a detached portion enabling a roller 18 to be extracted from guide 17 at the gap defined between the two portions 17a and 17b of guide 17; by utilizing portion 17b the table 15 can be moved substantially from one lateral edge to the other of table 4.

Clearly, changes may be made to machine 1 as described and illustrated herein without, however, departing from the scope of the present invention.

Figure 5A:
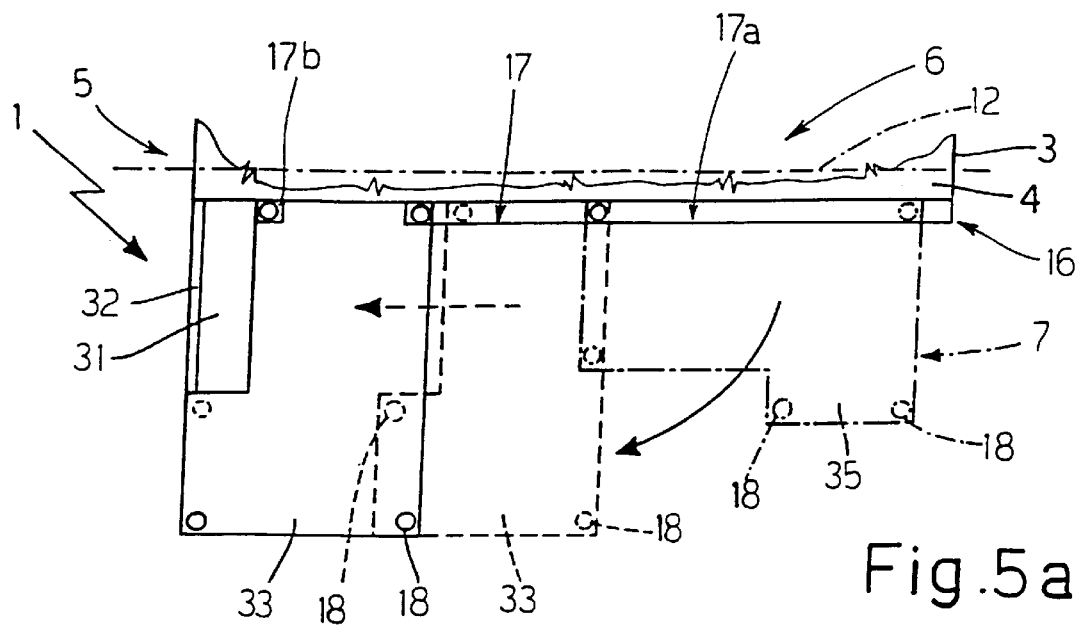
FIGS. 5a and 5b show top plan views, with parts removed for clarity, of a second preferred embodiment of FIG. 1 in two different operating conditions.
Figure 5B:
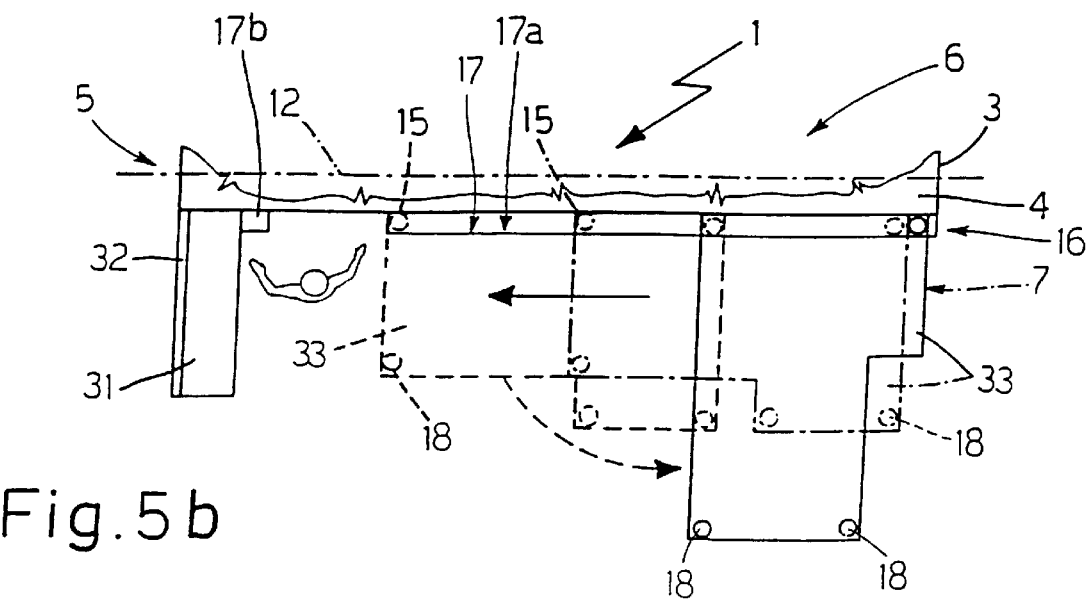

For example, to cut small-size panels 2 without using table 15, table 4 may conveniently be modified by applying a fixed lateral appendix 31 as shown in FIGS. 5a and 5b. Appendix 31 is substantially rectangular, is elongated in a direction perpendicular to line 12, and comprises, along one longitudinal edge, a lateral stop 32 extending the whole length of appendix 31 and high enough to laterally locate a panel 2 or block of panels 2. As table 15 is normally rectangular, and the presence of table 15 alongside and contacting appendix 31 prevents the formation of a single rectangular lateral supporting surface, rectangular table 15 may be replaced by an L-shaped table 33 (FIGS. 5a and 5b) having a recess for exactly housing appendix 31. Table 33 comprises five corners, each having a roller 18, and may assume all the configurations and positions of table 15, including one particular position in which it forms a single rectangular supporting surface with appendix 31. The need to rotate table 33 clockwise, as in FIG. 5a, and also anticlockwise, as in FIG. 5b, means guide 17 must be shortened enough to allow a roller 18 to be extracted from the end facing appendix 31, but also to allow a roller 18 to be locked adjacent to appendix 31. For this purpose, guide 17 is shortened and divided into two portions 17a and 17b: portion 17a is substantially the same length as the long side of table 33, and is fitted to base 3 as of the free lateral edge of table 4; while portion 17b, which is located adjacent to appendix 31, is just long enough to house a roller 18.

FIGS. 5a and 5b show how table 33 is rotated respectively clockwise and anticlockwise as of a position in which rollers 18 at the long-side corners of table 33 are inserted inside portion 17a. More specifically, in FIG. 5a, table 33 is rotated and positioned contacting appendix 31; while, in FIG. 5b, table 33 is located at the free lateral edge of table 4. It should be pointed out that, in FIGS. 5a and 5b, table 33 is indicated by a dash-and-dot line in the respective start positions, by a continuous line in the respective end positions, and by a dash line in the respective intermediate positions. A work station is obviously defined between appendix 31 and table 33, in which the operator may, for example, unload a strip or board off table 33 and load it onto appendix 31, from where the strip or board is transferred, by means of device 27, onto table 4 on the opposite side of line 12, and then fed to cutting station 5 where the strip or board is cut into pieces and deposited onto appendix 31.

Figure 6:
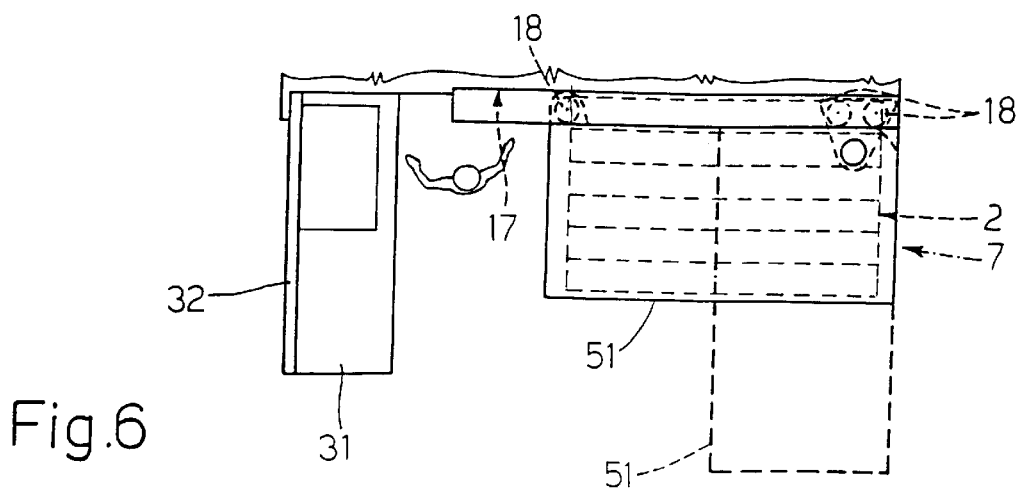
FIG. 6 shows a top plan view, with parts removed for clarity, of a third preferred embodiment.

FIG. 6 shows a variation of machine 1 in FIG. 1, wherein table 15 is replaced by a table 51 having, at a first corner, a first roller 18 similar to those of machine 1 and so formed as to act as a pivot member about the vertical axis of which table 51 rotates. At a second corner aligned with the first, however, table 51 comprises a second roller 18 engaging guide 17 but which does not define a pivot member. That is, table 51 may rotate about the pivot member, once table 51 is moved along guide 17 to extract second roller 18 from the guide, and may be moved parallel to line 12 when guide 17 is engaged by first roller 18 alone or by both rollers 18.

The advantages of the present invention will be clear from the foregoing description.

In particular, machine 1 comprises an output station 7 with one or two tables, and one table is movable, as described above, to alter the configuration of output station 7 according to the cutting pattern, and so enable different cutting patterns to be performed. The possibility of sliding the movable table parallel to one side of the table provides for selecting the cutting reference as required, and also for selecting the portion of device 27 by which to grip the bodies for cutting. Since, for cost reasons, push grips 28 are not normally provided in large numbers, and are not equally spaced with respect to cutting line 12, a predetermined number of push grips 28 may be concentrated at one portion of device 27, and a smaller number at another portion of device 27. That is, it is possible to define a portion with push grips 28 by which to conveniently grip small-size bodies for cutting, and a portion with push grips 28 by which to conveniently grip large-size bodies. For all the above reasons, the present invention therefore provides for a highly versatile machine.

I claim:

1. A machine (1) for cutting flat bodies (2), said machine (1) comprising a base (3); an input station (6) having a fixed first table (4) for supporting flat bodies (2); an output station (7) located downstream from said input station (6) and separated from the input station by a cutting station (5) in which is defined a straight cutting line (12), said line (12) being travelled by a rotary tool (14) for cutting the flat bodies (2) in a given cutting pattern; feed means (27) for feeding said flat bodies (2) to said cutting station (5) in a direction perpendicular to said line (12); and at least one movable second table (15, 33 or 51) for receiving said flat bodies (2) from said cutting station (5) via said feed means (27); connecting means (16) for connecting said second table (15, 33 or 51) to said base (3) being provided to enable said second table (15, 33 or 51) to rotate about at least one vertical axis; said connecting means (16) comprise a guide (17) fitted to said base (3) and at least one pivot member (18) fitted to said second table (15, 33 or 51) and cooperating with said guide (17) to enable said second table (15, 33 or 51) to rotate about said pivot member (18), so that said second table (15, 33 or 51) may be positioned with a long side parallel to said line (12) or with a short side parallel to said line (12); a plurality of said pivot members (18) fitted to respective corners (A, B, C, D) of said second table (15, 33 or 51); and said second table (15, 33 or 51) being rotatable about at least one of said pivot members (18) when said guide (17) is engaged by one of said pivot members (18), and being movable parallel to one of said sides when said guide (17) is engaged by two of said pivot members (18).

2. The machine as claimed in claim 1, wherein said guide (17) is open longitudinally to permit free insertion or withdrawal of said pivot members (18) inside from said guide (17).

3. The machine as claimed in claim 1, wherein said base (3) is fitted laterally with at least one elongated, substantially rectangular appendix (31).

4. The machine as claimed in claim 3, wherein said appendix (31) comprises at least one lateral longitudinal stop (32) for squaring said flat bodies (2).

5. The machine as claimed in claim 3, wherein said second table (15, 33 or 51) is defined by a plurality of sides so arranged as to define square corners.

6. The machine as claimed in claim 5, wherein said second table (15, 51) is rectangular.

7. The machine as claimed in claim 5, wherein said second table (33) is L-shaped.

8. The machine as claimed in claim 7, wherein said appendix (31) is so formed as to define, with said second table (33), a rectangular table.

9. The machine as claimed in claim 4, wherein said appendix (31) is fitted to said base (3) by means of a fixed connection, and extends perpendicular to said line (12).

10. The machine as claimed in claim 1, comprising lock means (24) for locking said second table (15, 33 or 51) in a work position with two of said pivot members (18) engaged simultaneously inside said guide (17).

* * * * *